United States Patent
Park et al.

(10) Patent No.: US 9,598,502 B2
(45) Date of Patent: Mar. 21, 2017

(54) METHOD OF MANUFACTURING ULTRA-LOW VISCOSITY HYDROXYALKYL CELLULOSE THROUGH PARTIAL NEUTRALIZATION METHOD

(71) Applicant: SAMSUNG FINE CHEMICALS CO., LTD, Ulsan (KR)

(72) Inventors: Ji Hun Park, Ulsan (KR); Yong Sung Jang, Ulsan (KR); Myeong Ho Jeon, Gyeongsangbuk-do (KR)

(73) Assignee: LOTTE FINE CHEMICAL CO., LTD., Ulsan (KR)

( * ) Notice: Subject to any disclaimer, the term of this patent is extended or adjusted under 35 U.S.C. 154(b) by 0 days.

(21) Appl. No.: 14/419,300

(22) PCT Filed: Sep. 30, 2013

(86) PCT No.: PCT/KR2013/008737
§ 371 (c)(1),
(2) Date: Feb. 3, 2015

(87) PCT Pub. No.: WO2014/092311
PCT Pub. Date: Jun. 19, 2014

(65) Prior Publication Data
US 2015/0210779 A1  Jul. 30, 2015

(30) Foreign Application Priority Data
Dec. 11, 2012 (KR) ........................ 10-2012-0143919

(51) Int. Cl.
| | | |
|---|---|---|
| *C08B 15/02* | (2006.01) | |
| *C08B 1/08* | (2006.01) | |
| *C08B 1/06* | (2006.01) | |
| *C09D 101/28* | (2006.01) | |
| *C08B 11/08* | (2006.01) | |
| *C08B 11/20* | (2006.01) | |

(52) U.S. Cl.
CPC ............ *C08B 15/02* (2013.01); *C08B 1/06* (2013.01); *C08B 1/08* (2013.01); *C08B 11/08* (2013.01); *C08B 11/20* (2013.01); *C09D 101/284* (2013.01)

(58) Field of Classification Search
CPC .............. C08B 15/02; C08B 1/08; C08B 1/06
See application file for complete search history.

(56) References Cited

U.S. PATENT DOCUMENTS

| | | | | |
|---|---|---|---|---|
| 3,728,331 A | * | 4/1973 | Savage | ................ C08B 11/02 536/5 |
| 4,363,784 A | * | 12/1982 | Hilbig | .................. C08B 17/06 422/134 |
| 6,054,511 A | | 4/2000 | Angerer et al. | |
| 6,939,961 B1 | | 9/2005 | Schlesiger | |
| 2004/0242862 A1 | * | 12/2004 | Hammes | ................ C08B 11/20 536/120 |
| 2010/0307379 A1 | | 12/2010 | Mallon | |

FOREIGN PATENT DOCUMENTS

| | | |
|---|---|---|
| JP | 2003-155301 A | 5/2003 |
| KR | 10-0901039 B1 | 6/2009 |

OTHER PUBLICATIONS

International Search Report for corresponding International Application No. PCT/KR2013/008737, mailed Jan. 24, 2014 (4 pages).

* cited by examiner

*Primary Examiner* — Jonathan S Lau
(74) *Attorney, Agent, or Firm* — Osha Liang LLP

(57) ABSTRACT

The present invention relates to a method of manufacturing ultra-low viscosity hydroxyalkyl cellulose through a partial neutralization method, and the method includes: reacting cellulose with an alkalizing agent to obtain alkalized cellulose; reacting the alkalized cellulose with an etherifying agent to obtain hydroxyalkyl cellulose; performing first neutralization of the hydroxyalkyl cellulose; decomposing the hydroxyalkyl cellulose by using hydrogen peroxide; and performing second neutralization of the hydroxyalkyl cellulose. Through the aforementioned method, ultra-low viscosity hydroxyalkyl cellulose can be manufactured while preventing a process problem, such as swelling, which may occur through the decomposition of an acid treatment.

2 Claims, 2 Drawing Sheets

METHOD OF MANUFACTURING ULTRA-LOW VISCOSITY HYDROXYALKYL CELLULOSE THROUGH PARTIAL NEUTRALIZATION METHOD

TECHNICAL FIELD

The present invention relates to a method of manufacturing ultra-low viscosity hydroxyalkyl cellulose through a partial neutralization method, and more particularly, to a method of manufacturing ultra-low viscosity hydroxyalkyl cellulose by introducing a partial neutralization method during a process of synthesizing hydroxyalkyl cellulose, that is, adding hydrogen peroxide after first neutralization to perform a reaction and then performing second neutralization.

BACKGROUND ART

Hydroxyalkyl cellulose is a kind of cellulose ether obtained by reacting cellulose and an alkylene oxide-based etherifying agent, and is an environmentally-friendly water-soluble polymer having excellent water solubility and thickening power and thus extensively used for paints, daily supplies, construction, emulsion polymerization, and the like.

Hydroxyalkyl cellulose, as illustrated in FIG. 1, is generally formed by adding cellulose, which is a main raw material, in a reaction solvent, adding an alkaline aid to perform alkalization for a predetermined time and thus form alkaline cellulose, adding an etherifying agent (for example, alkylene-based etherifying agent (ethylene oxide)), and increasing a temperature to 100° C. to perform a reaction, and subsequently, cooling is performed to 60° C. and an oxidizing agent is then added to perform neutralization. Thereafter, a post-process such as separation, filtering, drying, and pulverization processes is performed to manufacture hydroxyalkyl cellulose in a powder phase.

Physical properties of hydroxyalkyl cellulose manufactured as described above are represented by a viscosity of a solution thereof, and the viscosity can be adjusted through the degree of polymerization of cellulose that is mostly used as a raw material. However, ultra-low viscosity hydroxyalkyl cellulose applied for polymerization and dielectric purposes cannot be directly manufactured by the aforementioned method.

For that reason, in order to manufacture ultra-low viscosity hydroxyalkyl cellulose, a method of manufacturing ultra-low viscosity hydroxyalkyl cellulose through acid treatment of chlorine, hydrogen peroxide, and the like on a final product that is subjected to synthesis, washing, and pulverization processes is extensively used.

However, the method of manufacturing ultra-low viscosity hydroxyalkyl cellulose through acid treatment of the final product requires investment of additional equipment and a sufficient space for the additional equipment, and has a drawback in that productivity is reduced due to an additional process.

Therefore, the present inventors have studied a method of manufacturing ultra-low viscosity hydroxyalkyl cellulose in order to solve the aforementioned drawback, and found that ultra-low viscosity hydroxyalkyl cellulose can be manufactured by introducing a partial neutralization method during a process of synthesizing hydroxyalkyl cellulose, that is, introducing hydrogen peroxide after first neutralization to perform a reaction and then performing second neutralization, thereby completing the present invention.

DISCLOSURE

Technical Problem

A problem to be solved by the present invention is to provide a method of manufacturing ultra-low viscosity hydroxyalkyl cellulose by introducing a partial neutralization method during a process of synthesizing hydroxyalkyl cellulose.

Technical Solution

In order to solve the problem, the present invention provides a method of manufacturing ultra-low viscosity hydroxyalkyl cellulose through a partial neutralization method, including: reacting cellulose with an alkalizing agent to obtain alkalized cellulose; reacting the alkalized cellulose with an etherifying agent to obtain hydroxyalkyl cellulose; performing first neutralization of the hydroxyalkyl cellulose; decomposing the hydroxyalkyl cellulose by using hydrogen peroxide; and performing second neutralization of the hydroxyalkyl cellulose.

In the method of manufacturing ultra-low viscosity hydroxyalkyl cellulose according to the present invention, it is preferable that a neutralization ratio of the first neutralization be 40 to 80% and a neutralization ratio of the second neutralization be 20 to 60%.

Further, it is preferable that an addition amount of hydrogen peroxide added between the first neutralization and the second neutralization be in a range of 0.1 to 10 wt % based on a total weight of the hydroxyalkyl cellulose.

Further, a reaction time of added hydrogen peroxide may be changed according to a temperature condition, but a reaction is finished within about 20 minutes to 60 minutes.

In the method of manufacturing hydroxyalkyl cellulose according to the present invention, it is preferable that after the second neutralization, a post-process formed of washing, filtering, drying, pulverization, and distribution be performed.

Advantageous Effects

In a method of manufacturing hydroxyalkyl cellulose according to the present invention, it is possible to manufacture ultra-low viscosity hydroxyalkyl cellulose while preventing a process problem, such as swelling, which may occur through the decomposition of an acid treatment by introducing a partial neutralization method during a synthesis process.

Further, in the method of manufacturing hydroxyalkyl cellulose according to the present invention, it is possible to adjust a viscosity of hydroxyalkyl cellulose by adjusting a neutralization ratio and a content of hydrogen peroxide.

BEST MODE

Hereinafter, the present invention will be described in more detail with reference to the drawings.

Figure 1:
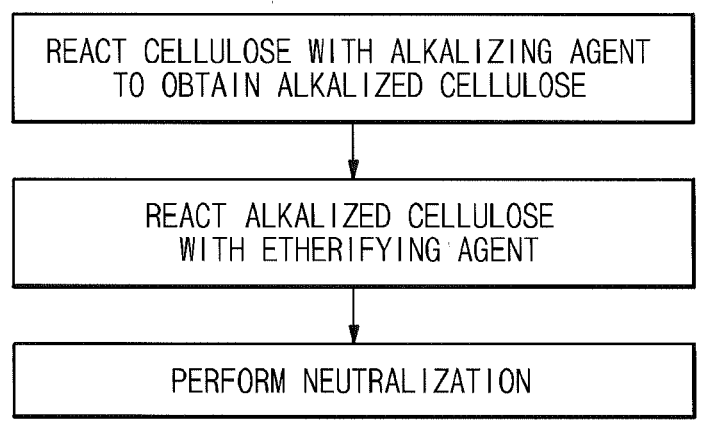
FIG. 1 is a flowchart illustrating a process of manufacturing hydroxyalkyl cellulose in the related art.
Figure 2:
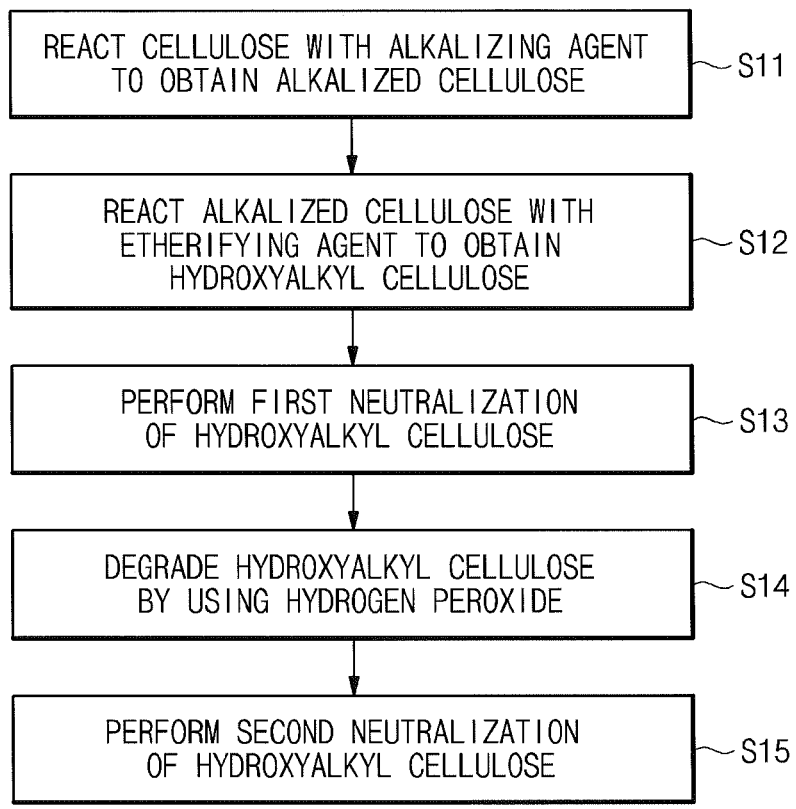
FIG. 2 is a flowchart illustrating a process of manufacturing ultra-low viscosity hydroxyalkyl cellulose through a partial neutralization method according to the present invention.

Referring to FIG. 2 illustrating a process of manufacturing ultra-low viscosity hydroxyalkyl cellulose through a partial neutralization method according to the present invention, a method of manufacturing ultra-low viscosity hydroxyalkyl cellulose according to the present invention includes: reacting cellulose with an alkalizing agent to obtain alkalized cellulose (S11); reacting the alkalized cellulose with an etherifying agent to obtain hydroxyalkyl cellulose (S12); performing first neutralization of the hydroxyalkyl cellulose (S13); decomposing the hydroxyalkyl cellulose by using hydrogen peroxide (S14); and performing second neutralization of the hydroxyalkyl cellulose (S15).

In the step of reacting the cellulose with the alkalizing agent to obtain alkalized cellulose (S11), after cellulose and a reaction solvent are added to a reactor, the alkalizing agent is added to alkalize cellulose.

The step of obtaining the alkalized cellulose may be performed under a reactant and a reaction condition generally used in this field, and for example, in the case of cellulose, a form obtained by pulping cellulose collected from cotton or wood may be used, and water, tertiary butyl alcohol, isopropyl alcohol, acetone, and the like may be used alone or in combination as the reaction solvent, but the reaction solvent is not limited thereto, and it is preferable that the reaction solvent be used in a content of 6 to 15 times based on a weight of cellulose. Sodium hydroxide generally used in this field may be used as the alkalizing agent, and a use amount thereof may be adopted in a range generally used in this field.

In the step (S12) of reacting the alkalized cellulose obtained in the step (S11) with the etherifying agent to obtain hydroxyalkyl cellulose, after the etherifying agent is added to alkalized cellulose, a temperature is increased to perform the reaction.

Likewise, the step of etherifying the alkalized cellulose may be performed under a reactant and a reaction condition generally used in this field, and for example, an alkylene-based oxide may be used as the etherifying agent, and the etherifying agent is preferably an ethylene oxide. The etherifying agent may be reacted with respect to cellulose at a weight ratio of 0.6 to 1.5, and in this case, reaction temperature and pressure are adjusted so that the etherifying agent can be uniformly substituted in a predetermined amount or more in a cellulose chain, and it is preferable that a maximum pressure be confirmed due to a problem such as stability. Specifically, the reaction temperature starts from 10 to 30° C. at an early stage and is increased to about 90 to 120° C. after the etherifying agent is added, and there is a slight difference in reaction pressure according to the temperature, but it is preferable to adjust the maximum pressure in a range of 6 to 9 kgf/cm$^2$. If the reaction is finished, the increased temperature is reduced back to 50 to 70° C.

In the step of performing first neutralization of the hydroxyalkyl cellulose (S13), a neutralizing agent is added to the hydroxyalkyl cellulose obtained in the step (S12) to perform neutralization. Herein, all oxidizing agents can be used as the neutralizing agent, and nitric acid, acetic acid, hydrochloric acid, and the like are mostly used in general hydroxyalkyl cellulose and may be used in a state of dilution of 40 to 90%.

A use amount of the neutralizing agent means an amount of the oxidizing agent added per an initially added alkalizing agent (sodium hydroxide), and is generally a mole amount of the same amount or higher, and this is configured to maintain a slurry in an acidic or neutral state after synthesis.

Since a neutralization reaction is very rapidly performed, there is no particular time limitation, but the neutralization reaction is performed for 10 minutes or more during a general process operation, and is preferably performed at 40° C. or more. Further, it is preferable that the neutralization reaction be performed under the reaction pressure of normal pressure or a slight pressure (about 1 kgf/cm$^2$).

It is preferable that a neutralization ratio during the first neutralization be 40 to 80%. Herein, the neutralization ratio means a ratio of the oxidizing agent added to neutralize the alkalizing agent added at an early stage of the reaction.

In the case where a first neutralization ratio is low, when hydrogen peroxide is added, a product is apt to be gelated, and on the contrary, in the case where the first neutralization ratio is high, a reduction in viscosity per the addition amount of hydrogen peroxide little occurs.

In the step of decomposing the hydroxyalkyl cellulose by using hydrogen peroxide (S14), hydroxyalkyl cellulose is decomposed by adding hydrogen peroxide. In this case, hydrogen peroxide may be added in a content of 0.1 to 10 wt % based on the total weight of hydroxyalkyl cellulose. It is preferable that an internal temperature and an internal pressure of the reactor be 45 to 75° C. and 0 to 3 kgf/cm$^2$, respectively.

A decomposition reaction by hydrogen peroxide may be performed at normal pressure, but since oxygen is generated by hydrogen peroxide, the reaction may be performed by filling nitrogen, which is an inert gas, due to a problem of stability with respect to this. Accordingly, the reaction pressure is a selective matter, it is preferable that the reaction be performed at about normal pressure or about 2 kgf/cm$^2$, and the decomposition reaction of hydrogen peroxide is finished within 20 to 60 minutes. In the case where the time is less than 20 minutes, since sufficient decomposition is not performed, ultra-low viscosity cannot be expected, and even though the time is more than 60 minutes, since further decomposition is not performed, it is preferable that the time of the decomposition reaction of hydrogen peroxide be 20 to 60 minutes.

In the step of performing second neutralization (S15), the neutralizing agent is added to the hydroxyalkyl cellulose decomposed in the step (S14) to perform neutralization. The neutralizing agent, and the reaction temperature and pressure used during the first neutralization are the same as those during the second neutralization. It is preferable that a second neutralization ratio be 20 to 60%.

After the second neutralization, a post-process formed of washing, filtering, drying, pulverization, distribution, and the like is performed, and may be performed by a general method in this field.

For example, washing and filtering are performed by stages through a mixture solvent of acetone/water using acetone in the range of a low concentration to a high concentration. Drying and pulverization are performed by a general method in this field, and classification into products having a predetermined size or less is performed through distribution to complete a final product, that is, ultra-low viscosity hydroxyalkyl cellulose.

Herein, ultra-low viscosity hydroxyalkyl cellulose generally has a viscosity of 500 cps or less when hydroxyalkyl cellulose is dissolved in a content of 2 wt % in water, and is frequently used in polymerization or dielectric fields.

Hereinafter, the present invention will be described in more detail with reference to Examples, but the present invention is not limited by the following Examples.

Example 1

Cellulose (200 g) was added to the pressure reactor, 2000 ml of the mixture solvent of tertiary butyl alcohol/isopropyl alcohol/water (weight ratio=83:6:11) was added as the reaction solvent, sodium hydroxide (120 g) was added as the alkalizing agent, and the reaction was performed with strong agitation at 25° C. to obtain alkalized cellulose. Subsequently, after ethylene oxide (220 g) was added, the reaction temperature was increased to 100° C., and the reaction was performed under the pressure of 8 kgf/cm². After the temperature was increased, the reaction was performed at the same temperature for 60 minutes, and when the reaction was finished, the temperature was reduced to 60° C., and the 60% nitric acid (64 g) was added as the neutralizing agent to perform first neutralization by about 60%. After 10 minutes, the 10% hydrogen peroxide aqueous solution (30 g) was added, and the reaction was then performed for 30 minutes. When the reaction was finished, the 60% nitric acid (96 g) was added again as the neutralizing agent to perform second neutralization. After neutralization was finished, 2000 ml of the mixture solvent of acetone/water was used at the concentration of 80%, 85%, 92%, and 97% to perform by stages washing and filtering and then perform drying and thus obtain hydroxyethyl cellulose.

Examples 2 to 6

The same procedure as Example 1 was performed with reference to the following Table 1, except that only the neutralization ratio, the addition amount of hydrogen peroxide, and the reaction time of hydrogen peroxide were changed, thereby obtaining hydroxyethyl cellulose.

Comparative Example 1

Cellulose (200 g) was added to the pressure reactor, 2000 ml of the mixture solvent of tertiary butyl alcohol/isopropyl alcohol/water (weight ratio=83:6:11) was added as the reaction solvent, sodium hydroxide (120 g) was added as the alkalizing agent, and the reaction was performed with strong agitation at 25° C. to obtain alkalized cellulose. Subsequently, after ethylene oxide (220 g) was added, the reaction temperature was increased to 100° C., and the reaction was performed under the pressure of 8 kgf/cm². After the temperature was increased, the reaction was performed at the same temperature for 60 minutes, and when the reaction was finished, the temperature was reduced to 60° C. After the 10% hydrogen peroxide aqueous solution (6 g) was added, the reaction was performed for 30 minutes. When the reaction was finished, the 60% nitric acid (160 g) was added as the neutralizing agent to perform neutralization. After neutralization was finished, 2000 ml of the mixture solvent of acetone/water was used at the concentration of 80%, 85%, 92%, and 97% to perform by stages washing and filtering and then perform drying and thus obtain hydroxyethyl cellulose.

Comparative Examples 2 to 3

The same procedure as Comparative Example 1 was performed with reference to the following Table 1, except that only the content of hydrogen peroxide was changed, thereby obtaining hydroxyethyl cellulose.

Comparative Example 4

Cellulose (200 g) was added to the pressure reactor, 2000 ml of the mixture solvent of tertiary butyl alcohol/isopropyl alcohol/water (weight ratio=83:6:11) was added as the reaction solvent, sodium hydroxide (120 g) was added as the alkalizing agent, and the reaction was performed with strong agitation at 25° C. to obtain alkalized cellulose. Subsequently, after ethylene oxide (220 g) was added, the reaction temperature was increased to 100° C., and the reaction was performed under the pressure of 8 kgf/cm². After the temperature was increased, the reaction was performed at the same temperature for 60 minutes, and when the reaction was finished, the temperature was reduced to 60° C., and the 60% nitric acid (160 g) was added as the neutralizing agent to perform neutralization. After neutralization was finished, the 10% hydrogen peroxide aqueous solution (30 g) was added, and the reaction was then performed for 30 minutes. 2000 ml of the mixture solvent of acetone/water was used at the concentration of 80%, 85%, 92%, and 97% to perform by stages washing and filtering and then perform drying and thus obtain hydroxyethyl cellulose.

Comparative Example 5

The same procedure as Comparative Example 3 was performed, except that only the content of hydrogen peroxide was changed, thereby obtaining hydroxyethyl cellulose.

Comparative Example 6

The same procedure as Example 1 was performed, except that the reaction time was 10 minutes after hydrogen peroxide was added in Example 1, thereby obtaining hydroxyethyl cellulose.

TABLE 1

| | Neutralization ratio before and after hydrogen peroxide is added | Addition amount of hydrogen peroxide per product | Reaction time of hydrogen peroxide [min] | Swelling[1] |
|---|---|---|---|---|
| Example 1 | 40:60 | 1.0 wt % (30 g) | 30 | Δ |
| Example 2 | 60:40 | 0.5 wt % (15 g) | 30 | X |
| Example 3 | 60:40 | 1.0 wt % (30 g) | 30 | X |
| Example 4 | 80:20 | 1.0 wt % (30 g) | 30 | X |
| Example 5 | 80:20 | 0.3 wt % (9 g) | 20 | X |
| Example 6 | 80:20 | 0.3 wt % (9 g) | 30 | X |
| Comparative Example 1 | 0:100 | 0.2 wt % (6 g) | 30 | Δ |
| Comparative Example 2 | 0:100 | 0.5 wt % (15 g) | 30 | Δ |
| Comparative Example 3 | 0:100 | 1.0 wt % (30 g) | 30 | ○ |
| Comparative Example 4 | 100:0 | 1.0 wt % (30 g) | 30 | X |
| Comparative Example 5 | 100:0 | 2.0 wt % (60 g) | 30 | X |
| Comparative Example 6 | 80:20 | 0.3 wt % (9 g) | 10 | X |

[1]Degree of swelling of the product after the decomposition process according to addition of hydrogen peroxide is shown (○: the post-process is impossible because the degree of swelling is severe, Δ: the degree of swelling is small but process efficiency is reduced, and X: swelling hardly exists)

Evaluation Example

The viscosity, the ash, and the chromaticity with respect to the hydroxyethyl cellulose obtained in Examples 1 to 6 and Comparative Examples 1, 2, and 4 to 6 were evaluated, and the results are shown in the following Table 2. For reference, in the case of Comparative Example 3, since the degree of swelling was severe, the post-process was impossible, and thus the evaluation was not made.

Viscosity: BROOKFLELD (LVDV-III+ TYPE) was used, the hydroxyalkyl cellulose product was added to distilled water, the (2 wt %) product was completely dispersed, five drops of sodium hydroxide were added, complete dissolution was performed, and the viscosity was measured at 25° C.

Ash: The ash means the impurity in the product, and in the present experiment, when the neutralization reaction between sodium hydroxide and the nitric acid occurs, the salt called sodium nitrate is generated, and this is called the salt (ash). The ash was determined by adding five drops of sulfuric acid to 2 g of the product, performing strong heat incineration in the electric furnace at 700° C., performing cooling to 300° C. and adding the nitric acid and the sulfuric acid to remove the organic material, burning the used sulfuric acid and nitric acid at 300° C. to remove the sulfuric acid and the nitric acid, and performing conversion into the residual weight after strong heat incineration in the electric furnace at 700° C.

Chromaticity: The sample was completely packaged in the standard sample cup (Non-separable NR-707) to be charged (about 10 g), and the chromaticity was then measured through the color-difference meter (Datacolor 65). Inferiority is exhibited as the chromaticity value is increased.

TABLE 2

|  | Viscosity (cPs) | Ash | Chromaticity |
| --- | --- | --- | --- |
| Example 1 | 29 | 3.1% | 7.9 |
| Example 2 | 99 | 2.6% | 5.0 |
| Example 3 | 55 | 3.8% | 4.1 |
| Example 4 | 242 | 4.2% | 4.3 |
| Example 5 | 348 | 1.9% | 5.2 |
| Example 6 | 405 | 2.2% | 4.6 |
| Comparative Example 1 | 18 | 11.1% | 42.8 |
| Comparative Example 2 | 17 | 12.8% | 45.2 |
| Comparative Example 4 | 659 | 3.6% | 8.3 |
| Comparative Example 5 | 642 | 2.4% | 8.3 |
| Comparative Example 6 | 840 | 1.8% | 3.6 |

Through the results of Table 2, it can be seen that in the case where the process of adding hydrogen peroxide to react hydrogen peroxide is performed before neutralization, that is, in the case of Comparative Examples 1 and 2, swelling occurs to form the gel and the amount of the ash meaning the impurity in the product is large, and thus the preferable color cannot be obtained, in the case where the process is performed after neutralization, that is, in the case of Comparative Examples 4 and 5, a viscosity reduction effect is not sufficient, and thus ultra-low viscosity hydroxyalkyl cellulose cannot be obtained, and in the case of Comparative Example 6, ultra-low viscosity hydroxyalkyl cellulose cannot be obtained by the reaction time for 10 minutes after hydrogen peroxide is added, but in the case of Examples 1 to 6 according to the present invention, the viscosity can be controlled according to the content of hydrogen peroxide and Examples 1 to 6 are favorable in terms of the process and the quality.

The invention claimed is:

1. A method of manufacturing ultra-low viscosity hydroxyalkyl cellulose through a partial neutralization method, comprising:
   reacting cellulose with an alkalizing agent to obtain alkalized cellulose;
   reacting the alkalized cellulose with an etherifying agent to obtain hydroxyalkyl cellulose;
   performing first neutralization of the hydroxyalkyl cellulose in solution from the reacting the alkalized cellulose;
   decomposing the hydroxyalkyl cellulose in solution from the first neutralization by using hydrogen peroxide; and
   performing second neutralization of the hydroxyalkyl cellulose in solution from the decomposing,
   wherein a neutralization ratio of the first neutralization is 40 to 80%, and a neutralization ratio of the second neutralization is 60 to 20%,
   wherein a use amount of hydrogen peroxide is in a range of 0.1 to 10 wt % based on a total weight of the hydroxyalkyl cellulose, and
   wherein the decomposing, is a reaction of the hydroxyalkyl cellulose with hydrogen peroxide for 20 minutes to 60 minutes.

2. The method of claim 1, wherein after the second neutralization, a post-process including washing, filtering, drying, pulverization, and distribution is performed.

* * * * *